United States Patent
Chu et al.

(10) Patent No.: US 12,511,313 B2
(45) Date of Patent: Dec. 30, 2025

(54) MATERIALIZED VIEW SUB-DATABASE REPLICATION

(71) Applicant: Snowflake Inc., Bozeman, MT (US)

(72) Inventors: Pui Kei Johnston Chu, Richmond Hill (CA); Shreyas Narendra Desai, Bellevue, WA (US); German Alberto Gil Echeverri, San Francisco, CA (US); Prasanna Krishnan, Palo Alto, CA (US); Nithin Mahesh, Redmond, WA (US); Subramanian Muralidhar, Mercer Island, WA (US); Eric Robinson, Sammamish, WA (US); Sahaj Saini, Seattle, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/806,986

(22) Filed: Aug. 16, 2024

(65) Prior Publication Data
US 2024/0403323 A1    Dec. 5, 2024

Related U.S. Application Data

(63) Continuation of application No. 18/295,987, filed on Apr. 5, 2023, now Pat. No. 12,093,284, which is a
(Continued)

(51) Int. Cl.
*G06F 16/00* (2019.01)
*G06F 16/22* (2019.01)
(Continued)

(52) U.S. Cl.
CPC ........ *G06F 16/275* (2019.01); *G06F 16/2282* (2019.01); *G06F 16/2379* (2019.01); *G06Q 30/0185* (2013.01); *G06Q 30/0205* (2013.01)

(58) Field of Classification Search
CPC ............... G06F 16/275; G06F 16/2282; G06F 16/2379; G06F 16/278; G06F 16/24552;
(Continued)

(56) References Cited

U.S. PATENT DOCUMENTS 6,845,383 B1    1/2005  Kraenzel et al.
9,251,020 B1 *  2/2016  Kalekar ............ G06F 11/2071
(Continued)

FOREIGN PATENT DOCUMENTS

CN    105938448    9/2016
CN    106156338    11/2016
CN    108521858    9/2018

OTHER PUBLICATIONS

"U.S. Appl. No. 18/295,987, Non Final Office Action mailed Dec. 21, 2023", 15 pgs.
(Continued)

*Primary Examiner* — Dinku W Gebresenbet
(74) *Attorney, Agent, or Firm* — Schwegman Lundberg & Woessner, P.A.

(57) ABSTRACT

A system for sub-table replication within a materialized view of a source data table. A materialized view of a source data table is generated based on a query, the source data table having a plurality of data table rows associated with a plurality of client identifiers and including an entitlements column and data content, the entitlements column including a plurality of provider account identifiers and a plurality of consumer account identifiers. An update to an entitlements table of the source data table is detected where the entitlements table includes a plurality of entitlements table rows and where the entitlements table rows are associated with the client identifiers, the consumer account identifiers, and the provider account identifiers. An update to the source data table based on the first update to the entitlements table is
(Continued)

detected, and an incremental replication of the materialized view of the source data table is performed.

30 Claims, 16 Drawing Sheets

Related U.S. Application Data continuation of application No. 17/804,753, filed on May 31, 2022, now Pat. No. 11,640,412, which is a continuation of application No. 17/226,141, filed on Apr. 9, 2021, now Pat. No. 11,372,891, which is a continuation of application No. 16/944,983, filed on Jul. 31, 2020, now Pat. No. 10,997,210.

(60) Provisional application No. 63/032,163, filed on May 29, 2020.

(51) Int. Cl.
*G06F 16/23* (2019.01)
*G06F 16/27* (2019.01)
*G06Q 30/018* (2023.01)
*G06Q 30/0204* (2023.01)

(58) Field of Classification Search
CPC . G06F 16/27; G06Q 30/0185; G06Q 30/0205
See application file for complete search history.

(56) References Cited

U.S. PATENT DOCUMENTS

| | | | |
|---|---|---|---|
| 2007/0143372 A1 | 6/2007 | Martinez et al. | |
| 2007/0192304 A1 | 8/2007 | Iyer et al. | |
| 2009/0300019 A1* | 12/2009 | Itkin | G06F 21/6227 |
| | | | 707/999.009 |
| 2010/0072640 A1 | 3/2010 | Rudmann et al. | |
| 2010/0325161 A1 | 12/2010 | Rutter et al. | |
| 2012/0011096 A1 | 1/2012 | Aggarwal | |
| 2012/0278282 A1 | 11/2012 | Lu et al. | |
| 2014/0081950 A1* | 3/2014 | Rajan | G06F 16/24549 |
| | | | 707/715 |
| 2017/0149886 A1 | 5/2017 | Shetty | |
| 2018/0068008 A1* | 3/2018 | Cruanes | G06F 16/278 |
| 2018/0137186 A1* | 5/2018 | Brodt | G06F 16/275 |
| 2021/0173851 A1 | 6/2021 | Dorne et al. | |
| 2021/0326359 A1 | 10/2021 | Upton et al. | |
| 2021/0365446 A1 | 11/2021 | Srivastava et al. | |

OTHER PUBLICATIONS

"U.S. Appl. No. 18/295,987, Notice of Allowance mailed May 17, 2024", 8 pgs.

"U.S. Appl. No. 18/295,987, Response filed Mar. 21, 2024 to Non Final Office Action mailed Dec. 21, 2023", 12 pgs.

"U.S. Appl. No. 18/494,599, Examiner Interview Summary mailed May 23, 2025", 2 pgs.

"U.S. Appl. No. 18/494,599, Final Office Action mailed Mar. 20, 2025", 14 pgs.

"U.S. Appl. No. 18/494,599, Non Final Office Action mailed Sep. 6, 2024", 17 pgs.

"U.S. Appl. No. 18/494,599, Notice of Allowance mailed Jul. 9, 2025", 13 pgs.

"U.S. Appl. No. 18/494,599, Response filed Jun. 19, 2025 to Final Office Action mailed Mar. 20, 2025", 11 pgs.

"U.S. Appl. No. 18/494,599, Response filed Dec. 5, 2024 to Non Final Office Action mailed Sep. 6, 2024", 15 pgs.

\* cited by examiner

MATERIALIZED VIEW SUB-DATABASE REPLICATION

CROSS REFERENCED TO RELATED APPLICATIONS

This application is a Continuation of U.S. patent application Ser. No. 18/295,987, filed Apr. 5, 2023, which is a Continuation of U.S. patent application Ser. No. 17/804,753, filed May 31, 2022 and now issued as U.S. Pat. No. 11,640,412, which is a Continuation of U.S. patent application Ser. No. 17/226,141, filed Apr. 9, 2021 and now issued as U.S. Pat. No. 11,372,891, which is a Continuation of U.S. patent application Ser. No. 16/944,983, filed Jul. 31, 2020 and now issued as U.S. Pat. No. 10,997,210, which claims priority to U.S. Provisional Patent Application Ser. No. 63/032,163, filed May 29, 2020, the contents of which are incorporated herein by reference in their entireties.

TECHNICAL FIELD

The present disclosure relates systems, methods, and devices for databases and more particularly relates to sub-database replication.

BACKGROUND

Databases are widely used for data storage and access in computing applications. Databases may include tables having rows and columns that include or reference data that can be read, modified, or deleted using queries.

In some instances, it may be beneficial to replicate database data in multiple locations or on multiple storage devices. Replicating data can safeguard against system failures that may render data inaccessible over a cloud network or may cause data to be lost or permanently unreadable. However, data replication across a network comprising various regions can induce latency as well as cost.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Databases can store enormous sums of data in an organized manner for providers and clients across a networked environment. For example, a provider can store data for a number of clients in a same database. When the clients are in different geographical regions, the database may need to be replicated to provide access to the data to the clients. Replicating entire databases across the networked environment can be costly and cause much latency due to the size of the databases. Accordingly, there is a need to replicate the relevant portions of the database to different regions.

Among other things, embodiments described in the present disclosure improve the functionality of the database service system 100 by implementing sub-database replication to different target regions in the network. Using the sub-database replication, the database service system 100 reduces the replication costs and replication latency by filtering non-critical objects.

Figure 1:
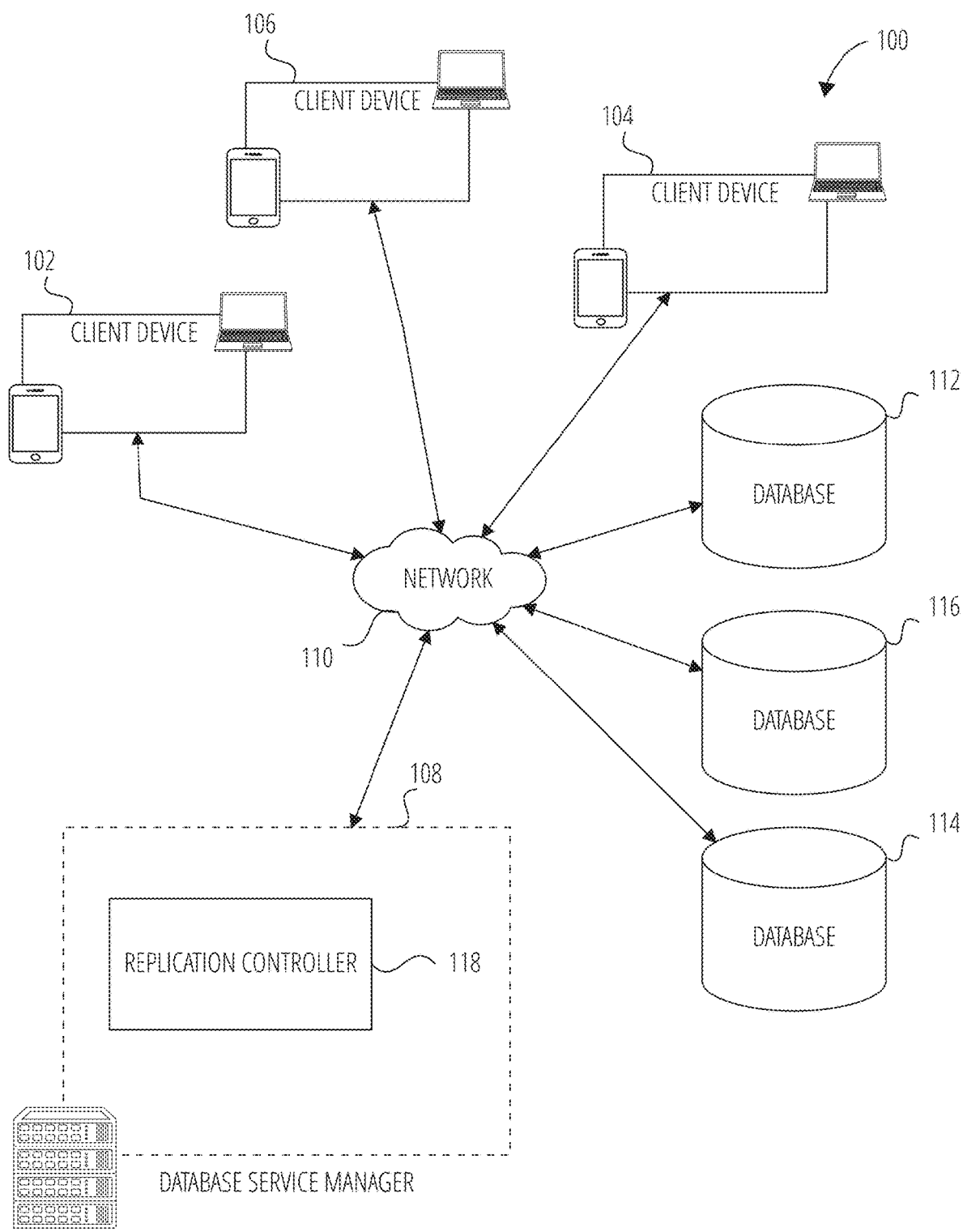
FIG. 1 is a diagrammatic representation of a networked environment in which the present disclosure may be deployed, in accordance with some examples.

FIG. 1 is a diagrammatic representation of a networked environment in which the present disclosure may be deployed, in accordance with some examples. The database service system 100 in FIG. 1 is a processing platform that provides for database services. In one embodiment, the database service system 100 can implement database replication or sub-database replication. Sub-database replication includes, for example, schema replication, table replication, sub-table replication, etc.

The database service system 100 includes a database service manager 108 that is accessible by multiple users via a network 110 (e.g., the Internet). The users can access the database service manager 108 using client device 102, client device 106, and client device 104, respectively. Database service manager 108 can support any number of users desiring access to data or services of the database service system 100. The users of client devices 102, 104, 106 may include, for example, end users providing data storage and retrieval queries and requests, system administrators managing the systems and methods described herein, software applications that interact with a database, and other components/devices that interact with database service manager 108.

The database service manager 108 may provide various services and functions that support the operation of the systems and components within the database service system 100. The database service manager 108 has access to stored metadata associated with the data stored throughout database service system 100. In some embodiments, metadata includes a summary of data stored in remote data storage systems (e.g., database 112, database 116, database 114, etc.) as well as data available from a local cache. Additionally, metadata may include information regarding how data is organized in the remote data storage systems and the local caches.

Database service manager 108 is further in communication with a plurality of data storage devices including database 112, database 116, and database 114 to perform various data storage and data retrieval operations. Although three databases 112, 114, and 116 are shown in FIG. 1, the database service system 100 is capable of including any number of data storage devices. In some embodiments, databases 112, 114, and 116 are cloud-based storage devices located in one or more geographic locations. For example, databases 112, 114, and 116 may be part of a public cloud infrastructure or a private cloud infrastructure, or any other manner of distributed storage system. Databases 112, 114, and 116 may include hard disk drives (HDDs), solid state drives (SSDs), storage clusters, or any other data storage technology. Additionally, while not shown, the databases 112, 114, and 116 can be comprised in a storage platform that may further include a distributed file system (such as Hadoop Distributed File Systems (HDFS)), object storage systems, and the like.

While the database service manager 108 and the databases 112, 114, 116 are shown in FIG. 1 as individual components, each of the database service manager 108 and the databases 112, 114, 116 may be implemented as a distributed system (e.g., distributed across multiple systems/platforms at multiple geographic locations) or may be combined into one or more systems.

As shown in FIG. 1, the database service manager 108 includes a replication controller 118 that implements database replication or sub-database replication in the database service system 100, according to some embodiments.

Database replication involves replication of the entire primary database (e.g., database 112) to a secondary database (e.g., database 116). In database replication, the database is the atomic unit of replication such that it can be replicated in its entirety or not at all. The main disadvantages of database replication include high cost and latency associated with replicating a large database in its entirety. Further, the users are not provided the opportunity to minimize their costs and latency by selecting or excluding objects in the database for replication. For example, some users want to exclude objects from their database from replication. In one implementation, the replication controller 118 can restructure the database to be replicated so that the desired units of replication match users' individual database boundaries.

Schema Filtering and Table Filtering

Figure 2:
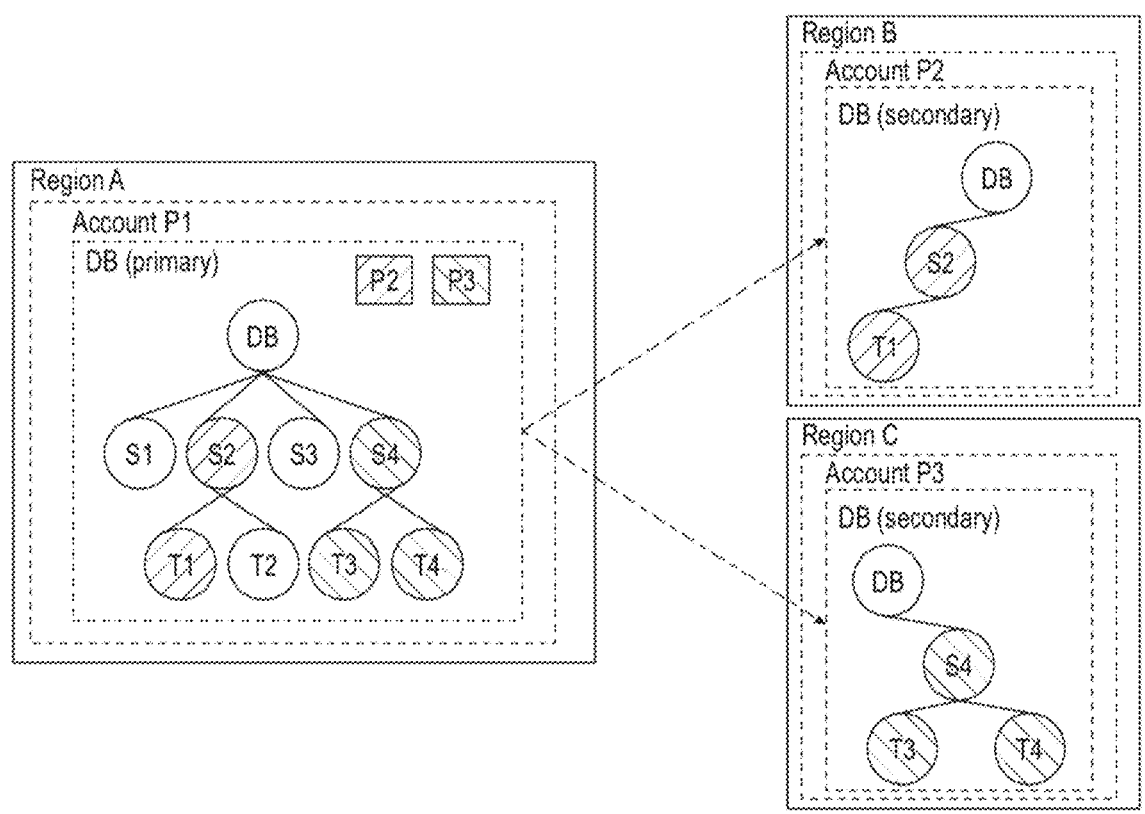
FIG. 2 illustrates a diagrammatic representation of the replication controller implementing sub-database replication using schema filtering and table filtering, in accordance with some examples.

To provide further flexibility to the users, the replication controller 118 can implement sub-database replication. FIG. 2 illustrates a diagrammatic representation 200 of the replication controller 118 implementing sub-database replication using schema filtering and table filtering, in accordance with some examples.

Within each database, there are a number of layers including schemas and tables. A schema is a logical container in the database, and a table is another container within the schema that has rows and columns. Schemas and tables can be represented as objects to allow for schema-level and table-level filtering.

In this embodiment, the replication controller 118 receives from each user an inclusion list or an exclusion list or any combination thereof. The inclusion list can comprise a list of objects from the database to be replicated and the target database associated with each object in the list. The objects can be on a schema, a table, or any combination thereof. The exclusion list can comprise a list of objects from the database to be excluded from replication to a target database.

As shown in FIG. 2, the user that is a provider has accounts P1, P2, P3 in regions A, B, and C respectively. Replication controller 118 receives an inclusion list from the user's client device 102 that identifies schema S2 and table T1 for replication to target database in account P2 in region B, and identifies schema S4, and tables T3 and T4 for replication to target database in account P4 in region C. In this example, replication controller 118 can also receive an exclusion list from the user's client device 102 that identifies table T2 that is included in schema S2 for exclusion from replication to target database in account P2 in region B.

Alternatively, the replication controller 118 can receive an exclusion list from the user's client device 102 that identifies schemas S1, S3, S4 and tables T2, T3, and T4 to be excluded from target database in account P2 in region B, and identifies schemas S1, S2, S3, and tables T1, T2 to be excluded from target database in account P3 in region C.

The replication controller 118 then causes the replication of the objects from the primary database in account P1 in region A based on the inclusion or the exclusion list to secondary databases in account P2 and P3 accordingly.

In one embodiment, the replication controller 118 generates a replication policy based on the inclusion or exclusion lists. For example, the replication controller 118 can apply a database replication policy to restrict replication of schemas and tables by name using the exclusion lists. Alternatively, the replication controller 118 can apply a database replication policy to allow replication of schemas and tables by name using the inclusion lists. In one implementation, the replication policy can be a new first-class database object that the customers can use to define the schemas and tables to replicate to target accounts. The primary database can also have multiple policies and multiple secondary databases.

Data Sharing

Figure 3:
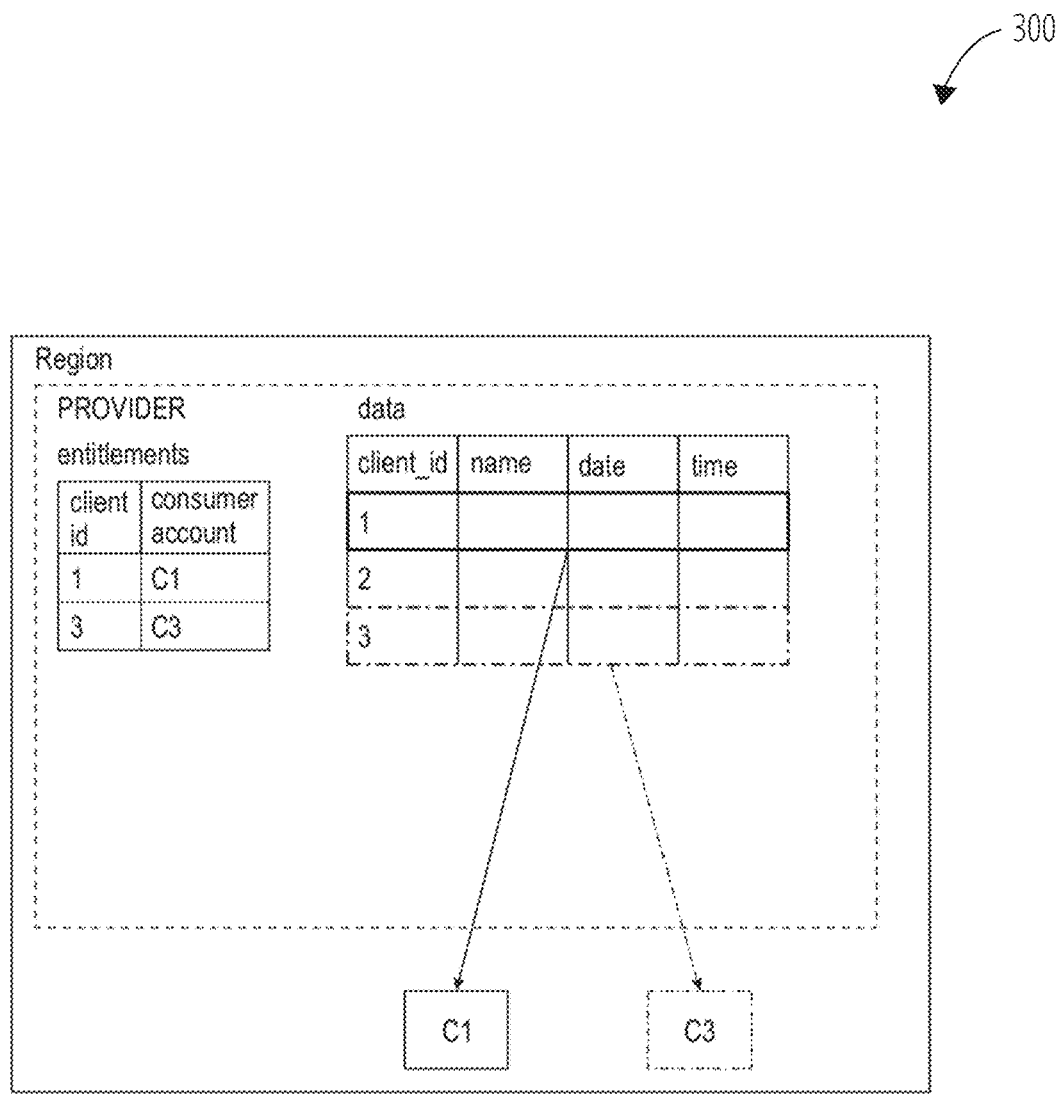
FIG. 3 is a diagrammatic representation of the replication controller implementing data sharing from the database to clients within the same region, in accordance with some examples.

FIG. 3 is a diagrammatic representation 300 of the replication controller 118 implementing data sharing from the database to clients within the same region, in accordance with some examples.

Some users in the database service system 100 are providers (e.g., provider user) that maintain and share data with their clients (that are also users of database service system 100). As shown in FIG. 3, the data can be stored in a single table (e.g., data table) that includes a customer identification (ID) (e.g., client_id) column. The table can also include columns for name, date, time. The data for all the clients (e.g., client_id 1, 2, 3) of the provider user can be stored in the table.

Referring to FIG. 3, the provider user is also provided with an entitlements table to manage the sharing of the data to their clients. The entitlements table includes columns for customer ID (e.g., client_id) and consumer account name (e.g., consumer account) associated with the database service system 100. From the entitlements table in FIG. 3, the customer ID 1 and 3 (e.g., client_id 1 and 3) also have accounts with the database service system 100 as consumer accounts C1, C3, respectively.

Since consumer accounts C1 and C3 are in the same region as the provider account, the replication controller 118 does not need to replicate data. The replication controller 118 joins the data table with the entitlements table on the customer ID, using a secure view to cause the relevant data from the data table to be shared with each of the consumer accounts. The replication controller 118 can receive queries from the consumer accounts C1 and C3 for their data from the data table. In response, as shown in FIG. 3, the replication controller 118 can select and share the rows that are associated with customer ID 1 (e.g., client_id 1) with the consumer account C1. Similarly, the replication controller 118 can select and share the rows that are associated with customer ID 3 (e.g., client_id 3) with the consumer account C3. Accordingly, the replication controller 118 is able to generate personalized shares where a subset of the table rows can be shared with each consumer account. In one example, the replication controller 118 identifies the current consumer account that is querying and selects and shares the rows associated with the identified consumer account.

Table-Level Replication

Figure 4:
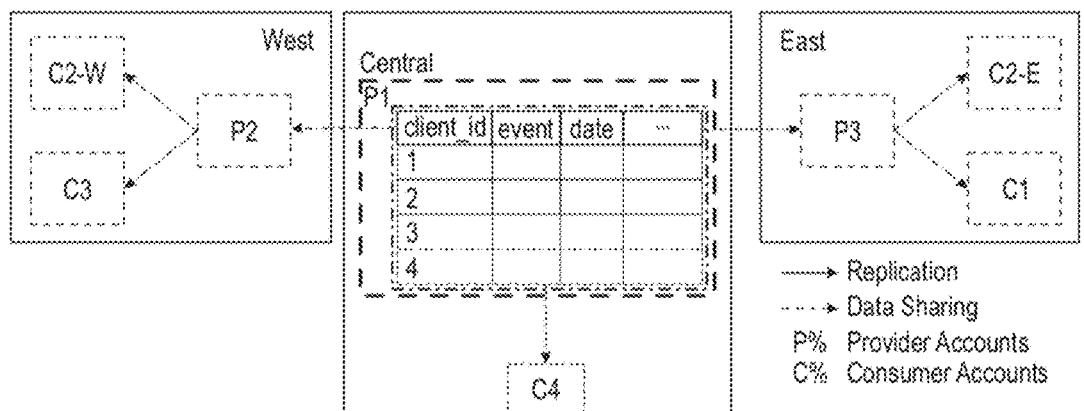
FIG. 4 illustrates a diagrammatic representation of the replication controller implementing table replication, in accordance with some examples.

When the consumers accounts are located in different regions from the data table (e.g., primary table), the replication controller 118 may replicate the entire table to provider accounts in the different regions and implement the personalized shares in FIG. 3 in each of the different regions. FIG. 4 illustrates a diagrammatic representation 400 of the replication controller 118 implementing table replication, in accordance with some examples.

In FIG. 4, the provider user has a provider account P1 in the Central Region, where the data table (e.g., primary data table) is stored. The provider user is storing data for clients with customer IDs (e.g., client_id) 1, 2, 3, 4 in the data table. As shown in the entitlements table, client_id 1 has a consumer account C1, client_id 2 has two consumer accounts C2-W, C2-E, client_id 3 has a consumer account C3, and client_id 4 has a consumer account C4. The entitlements table in FIG. 4 also includes a column that associates the customer IDs (client_id) with the provider accounts across different regions (e.g., provider account P1, P2, P3).

Since at least one consumer account (e.g., C1, C2-E, C2-W, C3, C4) is in the West region and in the East region, the replication controller 118 replicates the entire data table to the provider account P2 in the West region and the provider account P3 in the East region. Once the data table is in provider account P2, the replication controller 118 can share the subset of the table rows in the secondary table in provider account P2 with each consumer account C2-W and C3 in the West region (e.g., personalized shares). Similarly, once the data table is in provider account P3, the replication controller 118 can share the subset of the table rows in the secondary table in provider account P3 with each consumer account C2-E and C1 in the East region.

Since the consumer account C4 is in the same Central region as the provider user and the (primary) data table, the replication controller 118 can respond to query requests from consumer account C4 by sharing the data rows associated with client_id 4 to consumer account C4.

The disadvantage of the table replication in FIG. 4 is that rows in the primary data table that may not be needed in a region are being replicated in that region since replication controller 118 is replicating entire tables between regions. This can entail higher cost and higher latency.

Figure 5:
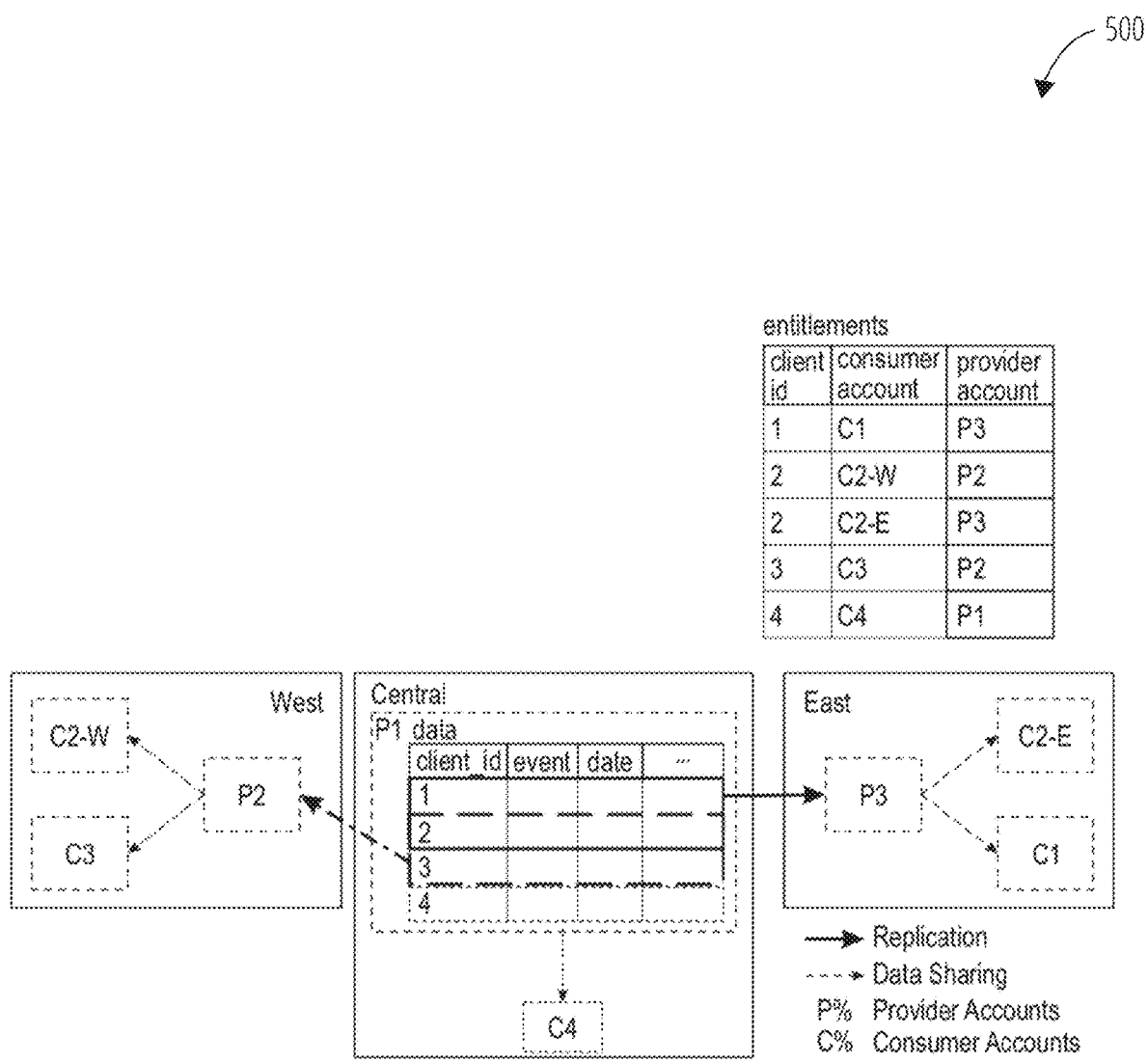
FIG. 5 illustrates a diagrammatic representation of the replication controller implementing sub-table replication, in accordance with some examples.

FIG. 5 illustrates a diagrammatic representation 500 of the replication controller 118 implementing sub-table replication, in accordance with some examples. In this embodiment, the replication controller 118 replicates the subset of table rows that are needed to be shared in a given region to the provider account in that region. For example, the replication controller 118 selects and replicates the subset of table rows (client_id 2, 3) that are needed to be shared to consumers (e.g., C3 and C2-W) to the provider account P2 in the West region. Similarly, the replication controller 118 selects and replicates the subset of table rows (client_id 1, 2) that are needed to be shared to consumers (e.g., C1 and C2-E) to the provider account P3 in the East region. Accordingly, compared to the table replication in FIG. 4, the sub-table replication in FIG. 5 improves the cost and the latency.

Selecting the rows from the data table to be replicated is challenging because data in the primary data table can be materialized as contiguous units of storage called micro-partitions. The table can be a collection of micro-partitions. Each micro-partition is a file that contains between 50 MB and 500 MB of uncompressed data. The size of the micro-partition can be equal or less than 16 megabytes (MB). Groups of rows in the table can be mapped into individual micro-partitions organized in columns.

Further, using a data manipulation language (DML), changes can be made to the data in the data table. In some implementations, changes may be made by way of any DML statement. Examples of manipulating data may include, but are not limited to, selecting, updating, changing, merging, and inserting data into tables. When new data is inserted, database service manager 108 creates a new micro-partition. When data is updated, database service manager 108 marks the micro-partition storing the data for deletion and creates a new micro-partition for the updated data.

Given that many rows in a table are packed into these micro-partitions, in one embodiment, to perform row-level filtering, the replication controller 118 opens each micro-partition to review whether the rows therein are to be replicated for the different regions. This row-level filtering allows for precision but causes a slowdown in the replication.

Provider User Materialize Rows into Separate Objects

In another embodiment, the rows can be materialized into separate objects (e.g., separate tables) such that new micro-partitions are created for the rows that need to be replicated. In one implementation, the provider user materializes the rows from the data table to be replicated into a separate table. Specifically, the provider user can create a new table and specify therein the rows from the (primary) data table to be replicated. The rows in the new table are materialized as a new micro-partition and the provider user requests that the replication controller 118 replicate the new table. Since only the relevant rows are being replicated for a region, the replication costs and replication latency are lower. However, there is a higher storage cost because duplication of the data to be replicated is needed, there is higher Extract, Transform, Load (ETL) cost, and higher ETL latency because transformations are needed for each row of data to be stored in a new table and then replicated, and the effort required from the provider customer is high.

Replication Controller Materialize Rows into Materialized Views

In another implementation, to alleviate the effort required of the provider user, the replication controller 118 can materialize the rows from the data table to be replicated into materialized views.

A materialized view is a database object that includes final or intermediate results of a database query. The materialized view may include a local cached copy of database data, a subset of rows or columns of a table, the result of a join, the result of an aggregate function, and so forth. Materialized views may be defined by a client or system administrator and may include any suitable information. Materialized views are commonly generated to aid in the execution of specific common queries.

A materialized view as disclosed in the present application is a declarative specification of a persistent query result that is automatically maintained and transparently utilized. In one example, a materialized view includes a local copy of data located remotely or may include a subset of rows and/or columns (may be referred to as a "partition" or "micro-partition") of a source data table or join result or may alternatively include a summary using an aggregate function. Materialized views are generated by way of materialization, where the results of a query are cached similar to memoization of the value of a function in functional languages. Materialized views improve performance of expensive queries by materializing and reusing common intermediate query results in a workload. Materialized views are utilized to improve performance of queries at the expense of maintenance cost and increased storage requirements.

In one example, a materialized view can include a summary of the rows from the data table that are relevant to the provider user or that are associated with a query from the provider user. When the replication controller 118 detects an update to the data table, the replication controller 118 can update the materialized view accordingly. For example, when the update to the data table includes a new micro-partition being inserted into the source table, the replication controller 118 refreshes the materialized view by inserting the new micro-partition into the materialized view. Further, when the update to the data table includes deleting a micro-partition, the replication controller 118 can compact the materialized view by removing the deleted micro-partition from the materialized view. The data table can thus be replicated as is. For example, the replication controller 118 can establish and implement policies based on the replication target account. Since only the relevant rows are being replicated for a region, the replication costs and replication latency are low, but storage cost remains high and there is an added cost related to the materialized view.

Replication Controller Replicates Subset of Rows (Sub-Table Replication)

Rather than materializing the rows into separate new micro-partitions, in another embodiment, the replication controller 118 can replicate the subset of rows based on the replication target account without duplicating the subset of rows as illustrated in FIG. 5.

Row-Level Filtering Based on Provider User Specified Column

In one embodiment, to replicate the subset of rows, the replication controller 118 receives from the provider customer an identification of the column in a data table that is to be filtered and the filtering behavior to be applied. For example, in FIG. 5, the provider customer P1 can indicate that the customer ID column is to be filtered for client_id 1 rows and to replicate the client_id 1 rows in provider account P3 in the East region for consumer C1.

As discussed above, the replication controller 118 can perform row-level filtering by opening each micro-partition to review whether the rows therein are to be replicated for the different regions. This row-level filtering allows for precision but causes the replication performance to be slow.

File-Level Filtering Based on Provider User Specified Column

The metadata for each file (micro-partition) can indicate the minimum and the maximum values in each column of the file. Thus, for each micro-partition, the metadata indicates the minimum and maximum customer ID (client_id). For example, a micro-partition having a minimum and maximum client_id of 1 and 3 indicates a possibility of rows being associated with client_id 2. Without opening this micro-partition, the replication controller 118 can replicate this micro-partition for client_id 1, 2, and 3. By avoiding opening the micro-partitions, the replication performance is faster but also less precise. Specifically, the replication controller 118 that implements file-level filtering may be replicating unnecessary rows to some regions.

To improve on the precision, the replication controller 118 can cluster the tables based on a column that is defining the distribution policy to generate micro-partitions that are better sorted in that column. However, there is an added cost associated with the clustering.

Storing Provider User Specified Routing Policy

As discussed above, in addition to indicating the rows in the data table to be replicated, the provider user can also indicate the routing policy. For example, in FIG. 5, the provider customer P1 can indicate that the customer ID column is to be filtered for client_id 1 rows and to replicate the client_id 1 rows in provider account P3 in the East region for consumer C1. As shown in FIG. 5, the entitlements table can be a separate table where the provider user can specify the routing policy. In another embodiment, the entitlements table can also be stored as metadata to provide a faster access path to the routing policy. For example, the entitlements table can be a new first-class object for personalized sharing for defining the rows to which the consumers C1, C2, C3 that are entitled.

To implement the sub-table replication, the replication controller 118 can use entitlements applied at runtime or use an entitlements column within the (primary) data table that is maintained by the provider user or automated by the replication controller 118, or a combination thereof.

Sub-Table Replication: Entitlements Applied at Runtime

Figure 6:
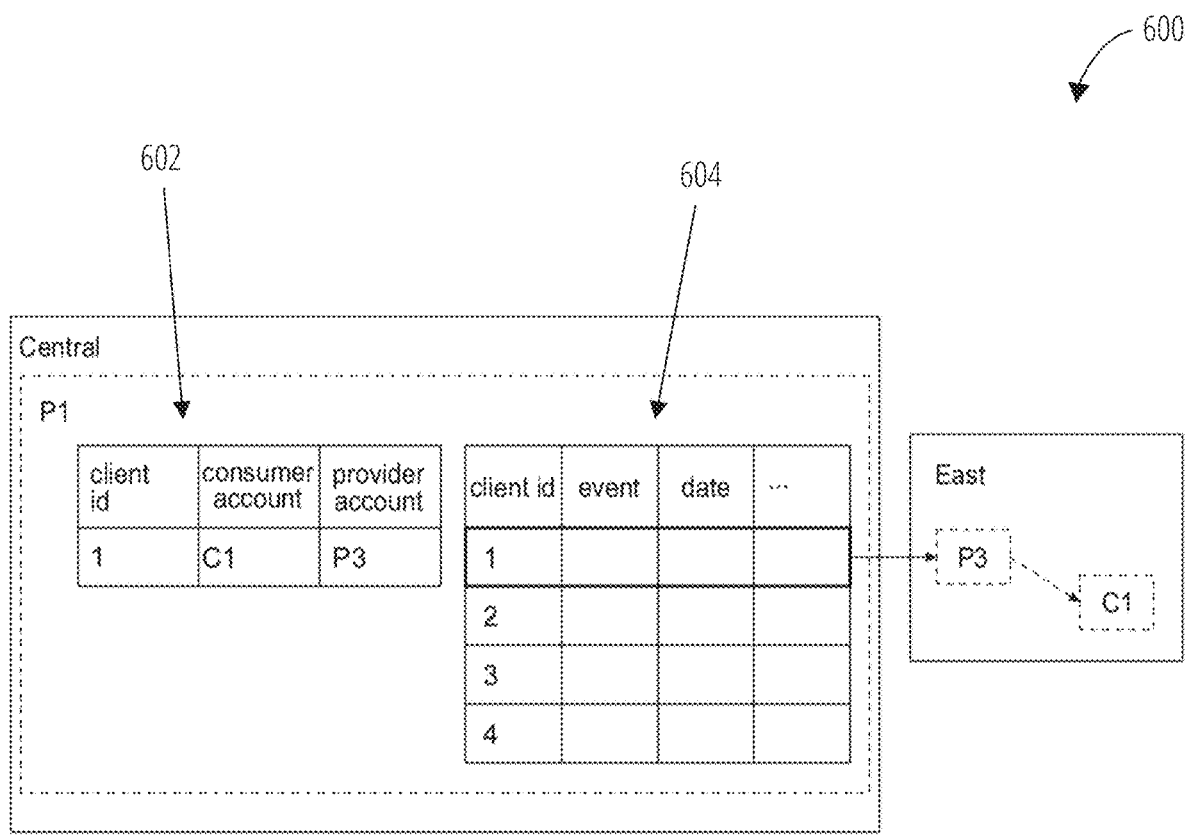
FIG. 6 illustrates a diagrammatic representation of the replication controller implementing sub-table replication using entitlements applied at runtime, in accordance with some examples.

FIG. 6 illustrates a diagrammatic representation 600 of the replication controller 118 implementing sub-table replication using entitlements applied at runtime, in accordance with some examples.

In FIG. 6, the provider user has a provider account P1 in the Central region with a data table 604 with rows of data for their clients 1, 2, 3, 4 (e.g., client_id 1, 2, 3, 4). The provider user indicates in the entitlements table 602 that client_id 1 is associated with consumer account C1 and provider account P3 in the East region. Accordingly, this change in the entitlements table 602 indicates that provider user wants to replicate from the Central region to the East region for consumer account C1.

In one example, the provider user's update to the entitlements table 602 to indicate that the client_id 1 is associated with consumer account C1 in the provider account P3 is a change in the entitlements table 602 that is detected by the replication controller 118 and causes the replication controller 118 to initiate the replication associated with the change.

In another example, the replication controller 118 can receive a request from provider account P3 for customer account C1. In this example, the provider user can specify the provider account P3 for a customer account C1.

Using the request, the replication controller 118 can (file-level) filter the micro-partition in the data table using the minimum and maximum client_id in the micro-partition metadata to locate the micro-partitions to be replicated to provider account P3. The replication controller 118 replicates the located micro-partitions to the provider account P3.

Figure 7:
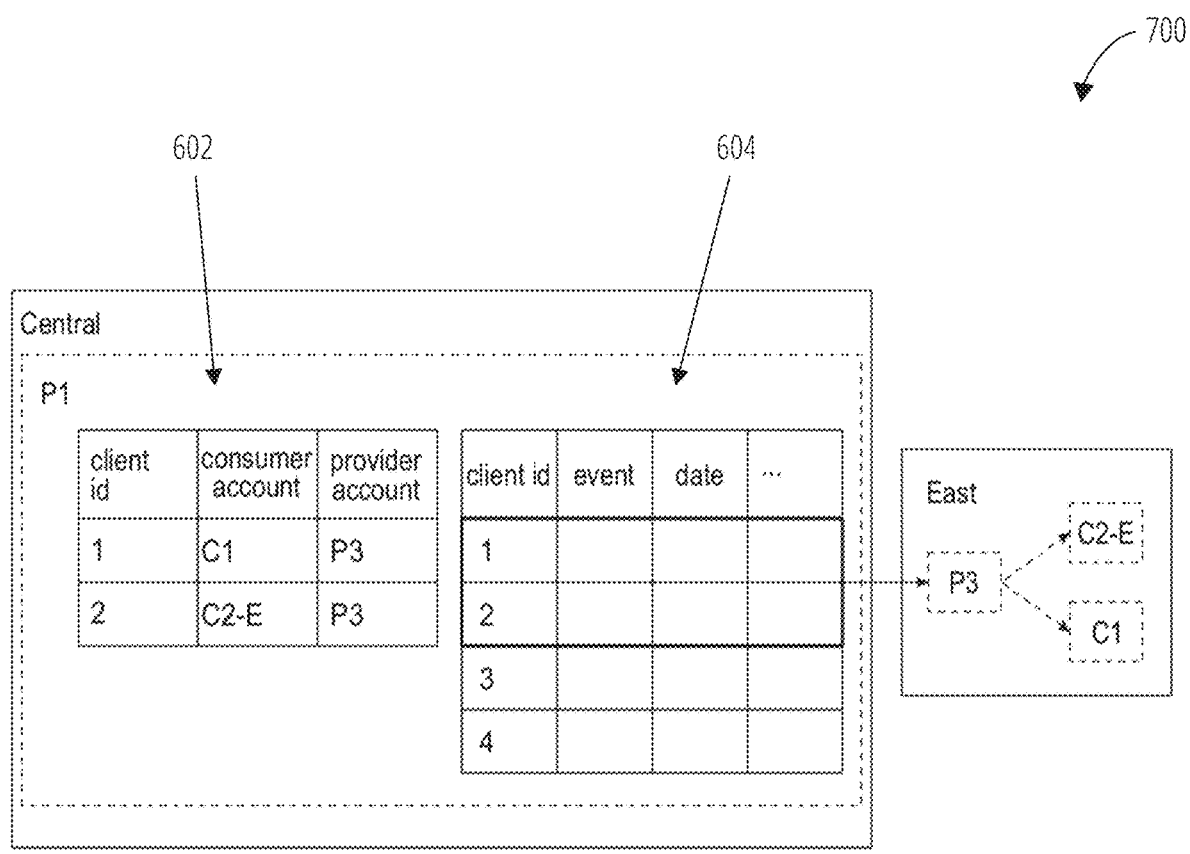
FIG. 7 illustrates a diagrammatic representation of the replication controller implementing sub-table replication using entitlements applied at runtime, in accordance with some examples.

When the provider user updates the entitlements table, the replication controller 118 needs to perform further sub-table replication. FIG. 7 illustrates a diagrammatic representation 700 of the replication controller 118 implementing sub-table replication using entitlements applied at runtime, in accordance with some examples.

In FIG. 7, the provider user indicates in the entitlements table 602 that client_id 2 is associated with consumer account C2-E and provider account P3 in the East region. This indicates that a new customer wants to have data replicated to the East region.

The replication controller 118 can perform incremental replication which uses two mechanisms: version-based and full inventory.

In version-based replication, when a change is made to the data table, the replication controller 118 can detect the change to the data table and perform the replication based on this new version of the data table. For example, performing version-based replication can include identifying the rows in the data table affected by the change and replicating these rows in the data table to the target accounts (e.g., provider accounts).

In full-inventory replication, when a change is made to an entitlements table, the replication controller 118 can select all the rows in the data table associated with the provider account identifiers in the entitlements table that are affected by the change.

Version-based replication is faster than full inventory. In one embodiment, when the entitlements table 602 changes, the replication controller 118 causes a full inventory at the next refresh to be executed for every target account (e.g., provider account). While the effort required from the provider user is low, the replication costs and replication latency associated with sub-table replication using entitlements applied at runtime is high.

Process of Implementing Sub-Table Replication: Entitlements Applied at Runtime

Although the described flowcharts can show operations as a sequential process, many of the operations can be performed in parallel or concurrently. In addition, the order of the operations may be rearranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems. For example, the processes can be performed by the replication controller 118 or a processor included in the replication controller 118, or a processor in database service manager 108, or a combination thereof.

Figure 8:
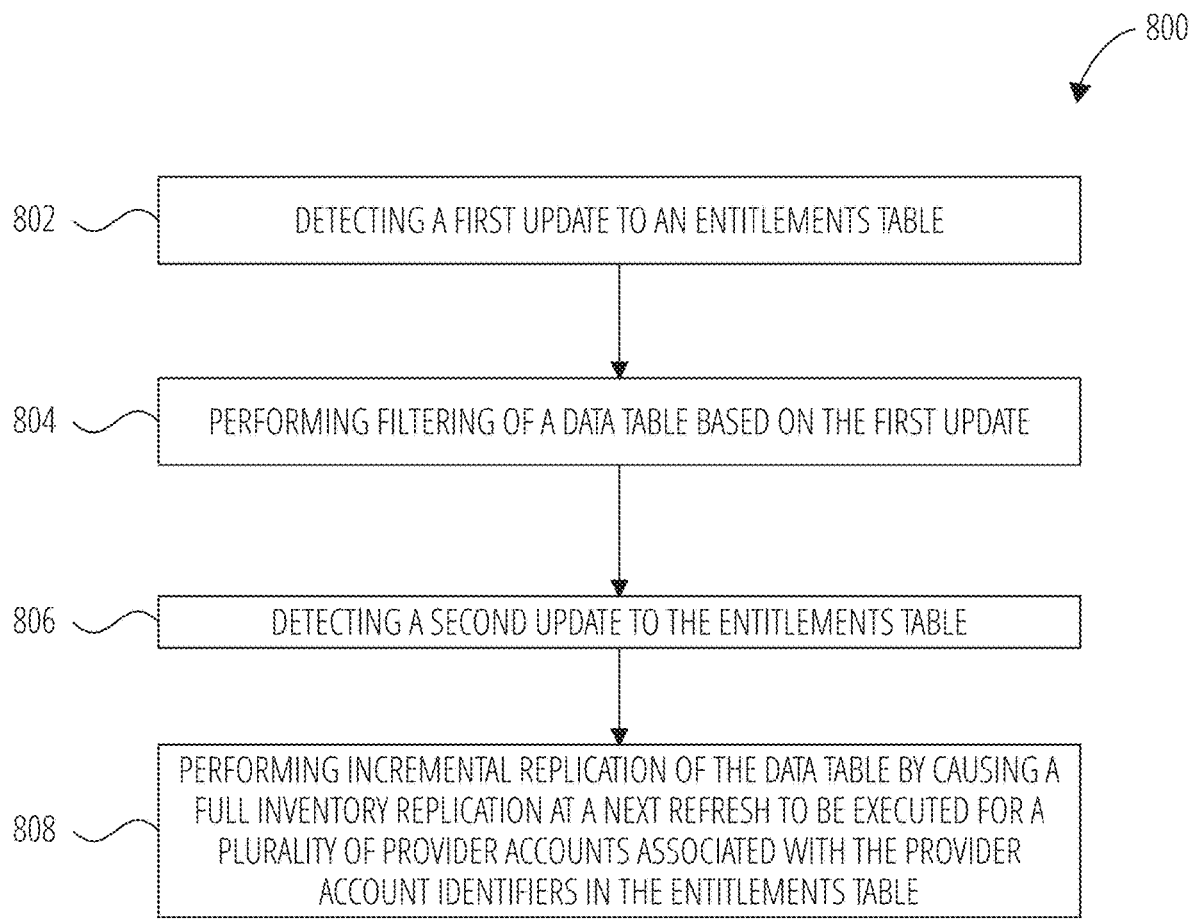
FIG. 8 illustrates a process 800 of implementing sub-database replication in accordance with one embodiment.

FIG. 8 illustrates a process 800 of implementing sub-database replication in accordance with one embodiment. At operation 802, a processor in the replication controller 118 detects a first update to an entitlements table 602. As shown in FIG. 6 and FIG. 7, the entitlements table 602 can include entitlements table rows that are associated with client identifiers, consumer account identifiers, and provider account identifiers. The entitlements table 602 can include entitlements table columns storing the consumer account identifiers and the provider account identifiers. As illustrated in FIG. 6 and FIG. 7, the provider account identifiers identify provider accounts in a plurality of geographic regions. The first update can be associated with a first entitlements table row of the entitlements table rows. The first update can include, for instance, a first client identifier of the client identifiers, a first consumer account identifier of the consumer account identifiers, or a first provider account identifier of the provider account identifiers.

At operation 804, the processor performs filtering of a data table 604 based on the first update. As shown in FIG. 6 and FIG. 7, the data table 604 can comprise data table rows associated with the client identifiers and including data content (e.g., event, date, payload, etc.). In one embodiment, the processor receives a replication request from the first provider account that includes a first consumer account identifier.

At operation 806, the processor detects a second update to the entitlements table 602. Examples of the first update and the second update to the entitlements table 602 includes adding a new entitlements table row to the entitlements table, deleting one of the entitlements table rows, or altering information included in one of the entitlements table rows. In one example, altering information included in one of the entitlements table rows includes altering the client identifiers, consumer account identifiers, or provider account identifiers.

At operation 808, the processor performs incremental replication of the data table 604 by causing a full inventory replication at a next refresh to be executed for provider accounts associated with the provider account identifiers in the entitlements table 602.

Figure 9:
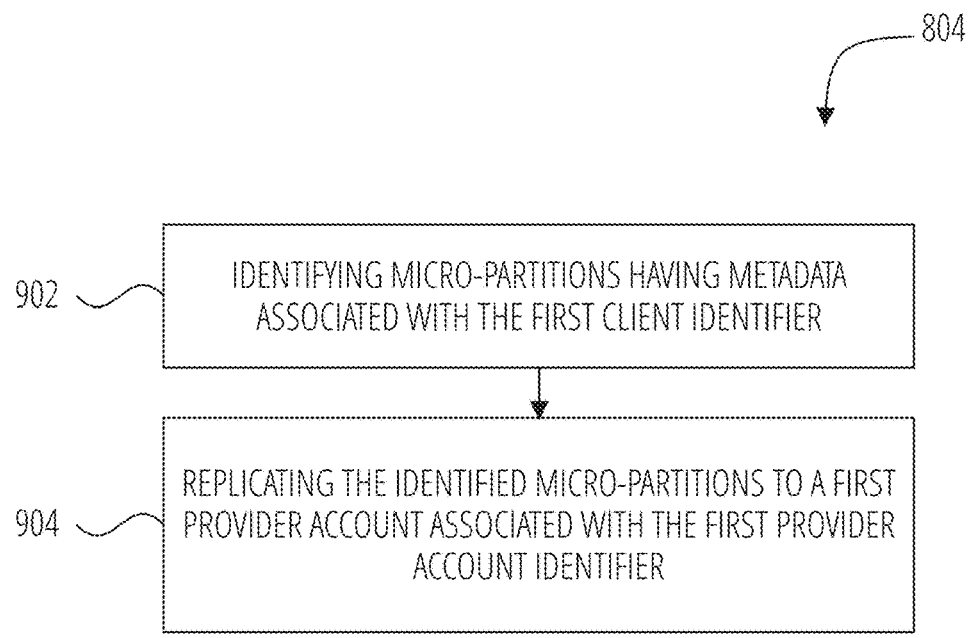
FIG. 9 illustrates the details of the operation 804 from FIG. 8 in accordance with one embodiment.

In one example, the processor performs filtering of the data table 604 in operation 804 by performing file-level filtering. FIG. 9 illustrates the details of the operation 804 from FIG. 8 in accordance with one embodiment.

At operation 902, the processor identifies micro-partitions in a plurality of micro-partitions in the data table 604 having metadata associated with the first client identifier. Each of the micro-partitions in the data table 604 can comprise one or more of the plurality of data table rows.

In one example, micro-partitions in the data table 604 comprises metadata including a minimum client identifier and maximum client identifier. In this example, the metadata is associated with the first client identifier when the first client identifier is within a range established by the minimum client identifier and the maximum client identifier.

At operation 904, the processor replicates the identified micro-partitions to a first provider account associated with the first provider account identifier.

Sub-Table Replication: Entitlements Column within Table

Figure 10:
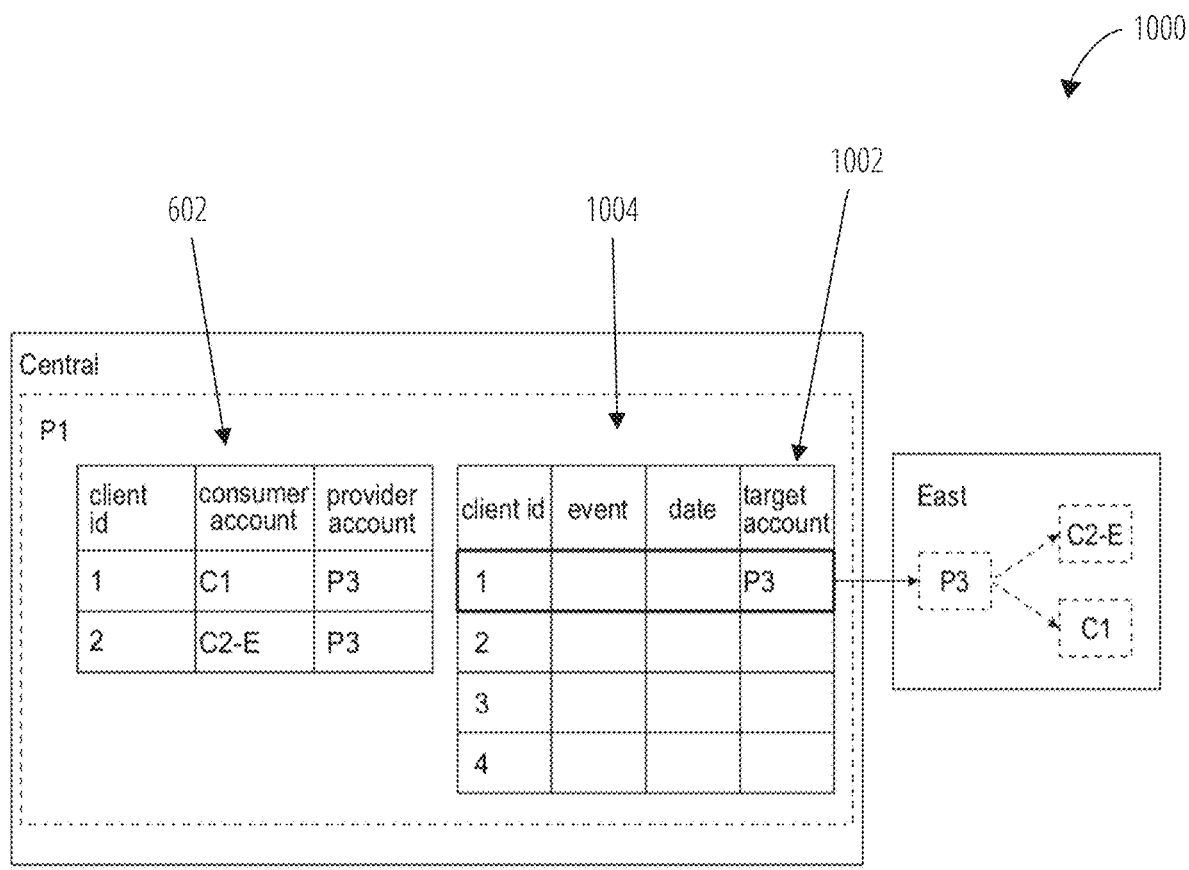
FIG. 10 illustrates a diagrammatic representation of the replication controller implementing sub-table replication using an entitlements column within the table, in accordance with some examples.

In order to cause a version-based replication to be performed, at least one change to the primary data table 604 is needed. For example, a table DML can be triggered to cause the replication controller 118 to perform version-based replication. FIG. 10 illustrates a diagrammatic representation 1000 of the replication controller 118 implementing sub-table replication using an entitlements column 1002 within the table, in accordance with some examples.

In FIG. 10, the (primary) data table comprises an entitlements column 1002 (e.g., target account column) that indicates the provider account associated with the row in the table. In one embodiment, the provider user updates the column in the data table 1004 whenever the entitlements table 602 change. The update to the entitlements column 1002 in the data table causes the replication controller 118 to perform version-based replication. For example, the replication controller 118 can update the data table 1004 version and create new micro-partitions to reflect the change in the entitlements table 602. In this embodiment, the replication controller 118 performing version-based replication includes replicating rows in the data table 1004 to the target accounts (e.g., provider accounts) using the entitlements column 1002.

Figure 11:
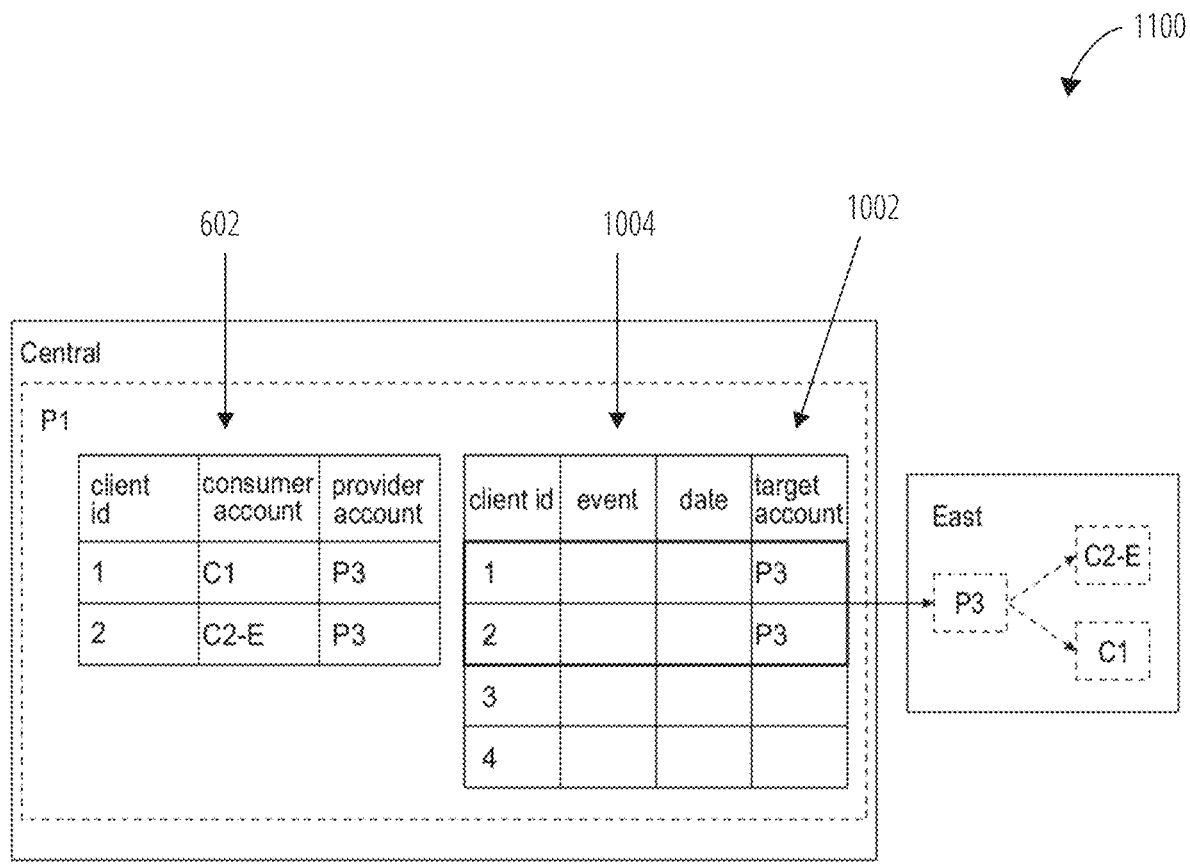
FIG. 11 illustrates a diagrammatic representation of the replication controller implementing sub-table replication using an entitlements column within the table, in accordance with some examples.

FIG. 11 illustrates a diagrammatic representation 1100 of the replication controller 118 implementing sub-table replication using an entitlements column within the table, in accordance with some examples.

In FIG. 11, the provider user updates the entitlements table 602 to indicate that client_id 2 is associated with consumer account C2-E and provider account P3 in the East region. In this embodiment, the provider user also updates the entitlements column 1002 in the data table 1004 to reflect that the row with client_id 2 is also associated with provider account P3.

As in FIG. 10, the update to the entitlements column 1002 in the data table 1004 causes the replication controller 118 to perform version-based replication. In this embodiment, the replication controller 118 performing version-based replication includes replicating rows in the data table 1004 to the target accounts (e.g., provider accounts) using the entitlements column 1002. As shown in both FIG. 10 and FIG. 11, sub-table replication using an entitlements column 1002 within the table lowers the replication cost and the replication latency, but there is higher ETL cost and ETL latency and the effort required from the provider user is much higher.

Sub-Table Replication: Virtual Entitlements Column within Table

Figure 12:
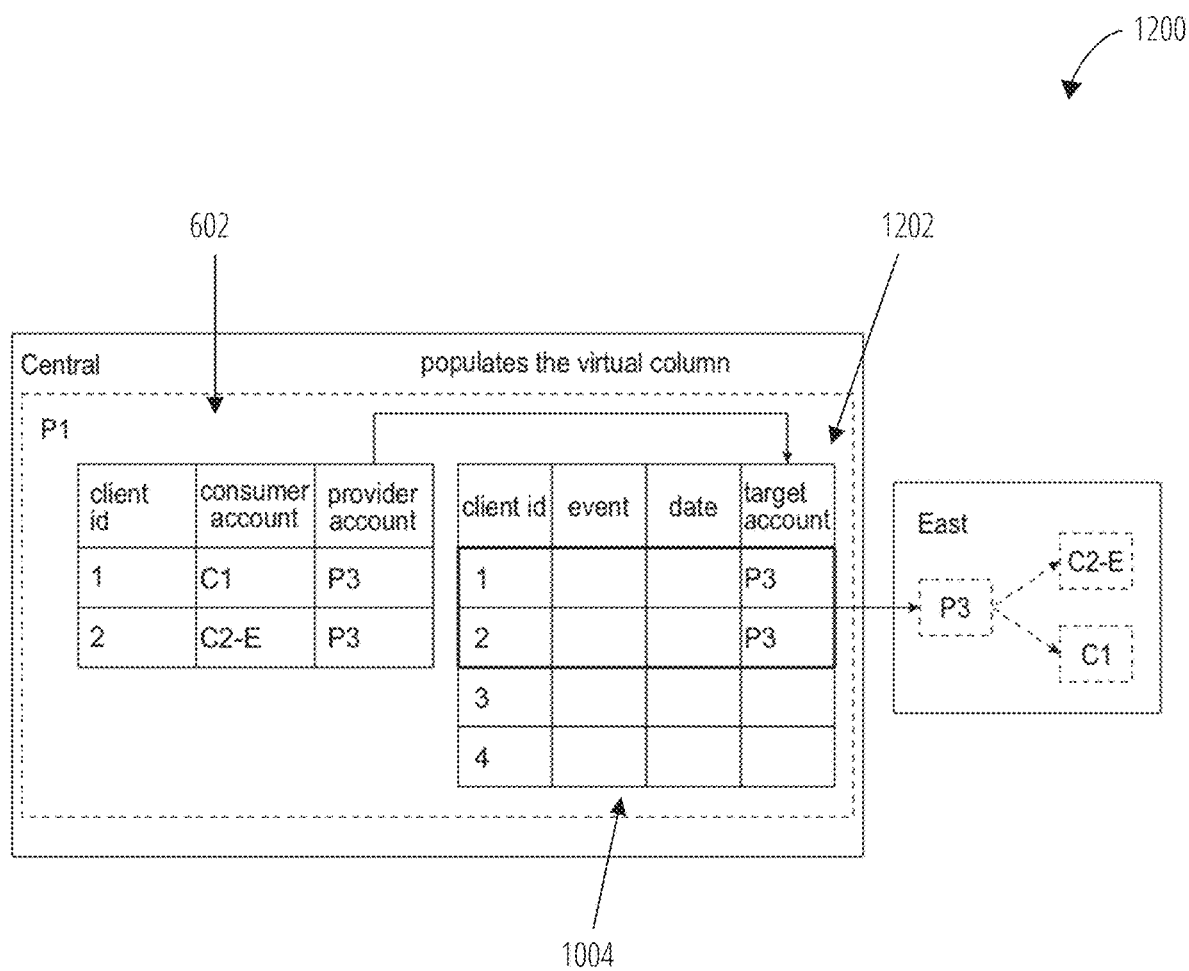
FIG. 12 illustrates a diagrammatic representation of the replication controller implementing sub-table replication using an entitlements column within the table, in accordance with some examples.

To alleviate the effort required by provider user, in one embodiment, the replication controller 118 can maintain a virtual entitlements column within the data table. FIG. 12 illustrates a diagrammatic representation 1200 of the replication controller 118 implementing sub-table replication using an entitlements column within the table, in accordance with some examples.

In FIG. 12, the (primary) data table comprises a virtual entitlements column 1202 (e.g., target account column) that indicates the provider account associated with the row in the data table 1004. The virtual entitlements column 1202 is maintained by the replication controller 118.

As shown in FIG. 12, the provider user updates the entitlements table 602 to indicate that client_id 1 is associated with consumer account C1 and provider account P3 in the East region and client_id 2 is associated with consumer account C2-E and provider account P3 in the East region. When the provider user updates the entitlements table 602, the replication controller 118 populates the virtual entitlements column 1202 in the data table 1004. In this embodiment, the replication controller 118 updates the virtual entitlements column 1202 for the rows of client_id 1 and 2 to indicate provider account P3. In response to this update to the virtual entitlements column 1202 in the data table 1004, the replication controller 118 can perform version-based replication. In this embodiment, the replication controller 118 performing version-based replication includes replicating rows in the data table 1004 to the target accounts (e.g., provider accounts) using the virtual entitlements column 1202.

While the ETL cost and ETL latency remains high, using the virtual entitlements column 1202 within the data table 1004 as shown in FIG. 12 lowers the replication cost and the replication latency. Further, since the replication controller 118 maintains the virtual entitlements column 1202, the effort level required from the provider user is reduced.

Figure 13:
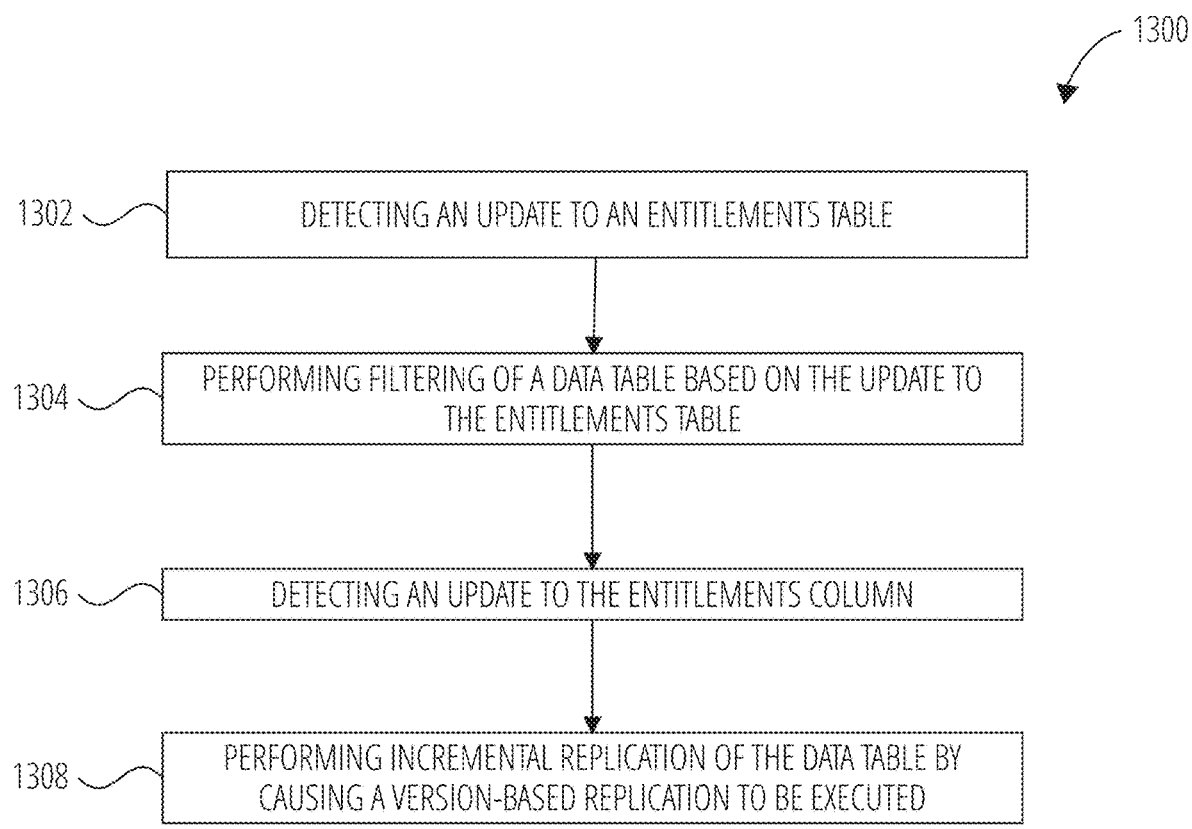
FIG. 13 illustrates a process 1300 of implementing sub-database replication in accordance with one embodiment.

Process of Implementing Sub-Table Replication: Entitlements Column within Table or Virtual Entitlements Column within Table FIG. 13 illustrates a process 1300 of implementing sub-database replication in accordance with one embodiment. At operation 1302, the processor of the replication controller 118 detects an update to an entitlements table 602. As shown in FIG. 10, FIG. 11, and FIG. 12, the entitlements table 602 can include entitlements table rows that are associated with client identifiers, consumer account identifiers, and provider account identifiers. The entitlements table 602 can include entitlements table columns storing the consumer account identifiers and the provider account identifiers. As illustrated in FIG. 10, FIG. 11, and FIG. 12, the provider account identifiers identify provider accounts in a plurality of geographic regions. The update to the entitlements table 602 can be associated with a first entitlements table row of the entitlements table rows. The update to the entitlements table 602 can include, for instance, a first client identifier of the client identifiers, a first consumer account identifier of the consumer account identifiers, or a first provider account identifier of the provider account identifiers.

Examples of the update to the entitlements table 602 in operation 1302 includes adding a new entitlements table row to the entitlements table, deleting one of the entitlements table rows, or altering information included in one of the entitlements table rows. In one example, altering information included in one of the entitlements table rows includes altering the client identifiers, consumer account identifiers, or provider account identifiers.

At operation 1304, the processor performs filtering of a data table 1004 based on the update to the entitlements table 602. As illustrated in FIG. 10, FIG. 11, and FIG. 12, the data table 1004 can comprise data table rows associated the client identifiers and includes an entitlements column 1002 (or a virtual entitlements column 1202) and data content (e.g., event, date, payload, etc.). As shown in FIG. 10, FIG. 11, and FIG. 12, the entitlements column 1002 (or virtual entitlements column 1202) can include the provider account identifiers. In one embodiment, the processor receives a replication request from the first provider account that includes a first consumer account identifier. In one example, the processor can perform file-level filtering in operation 1304 as detailed in FIG. 9.

At operation 1306, the processor detects an update to an entitlements column 1002 (or virtual entitlements column 1202). For example, the entitlements column 1002, in FIG. 10 and FIG. 11, is populated or updated by a provider user via a client device. The processor detecting an update to virtual entitlements column 1202 can further comprise determining that the update to the entitlements table 602 includes a change in one of the provider accounts identifiers in the entitlements table 602 and populating the virtual entitlements column 1202 based on the change in the one of the provider accounts identifiers in the entitlements table 602.

Figure 14:
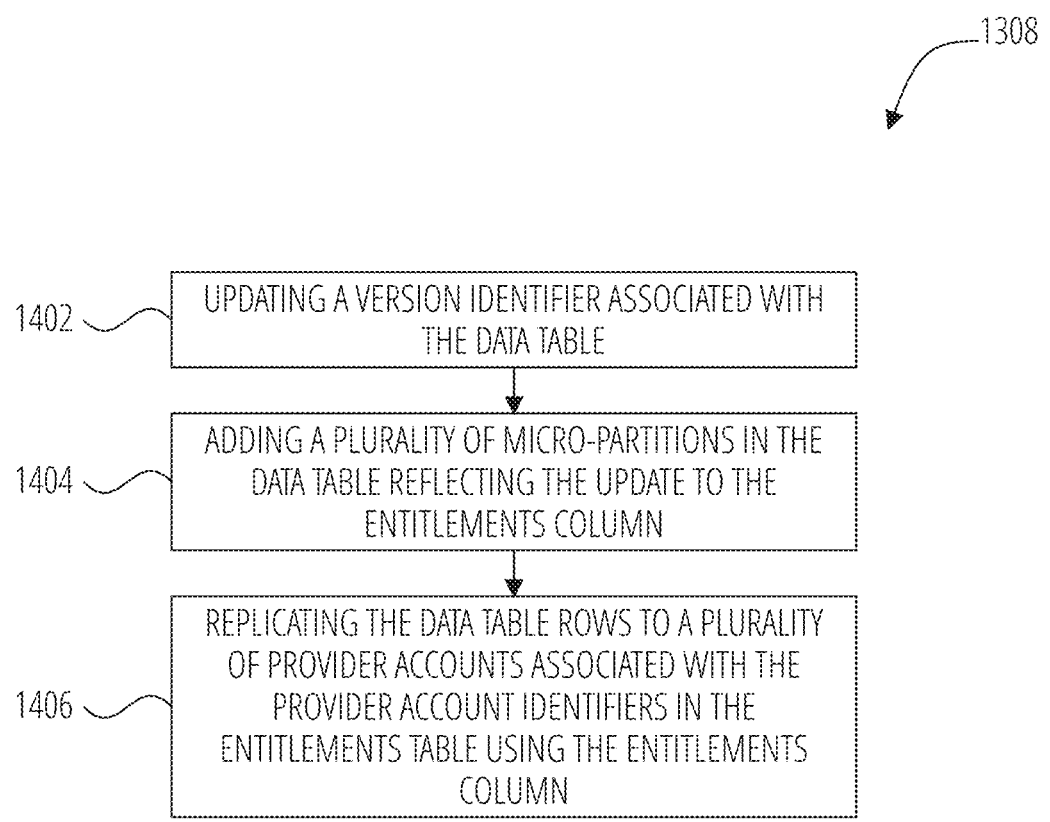
FIG. 14 illustrates the details of the operation 1308 from FIG. 13 in accordance with one embodiment.

At operation 1308, the processor performs incremental replication of the data table 1004 by causing a version-based replication to be executed. FIG. 14 illustrates the details of the process of version-based replication in operation 1308 from FIG. 13 in accordance with one embodiment. At operation 1402, the processor updates a version identifier associated with the data table 1004. At operation 1404, the processor adds a plurality of micro-partitions in the data table 1004 reflecting the update to the entitlements column 1002 (or virtual entitlements column 1202). At operation 1406, the processor replicates the data table rows to a plurality of provider accounts associated with the provider account identifiers in the entitlements table 602 using the entitlements column 1002 (or virtual entitlements column 1202).

Machine Architecture

Figure 15:
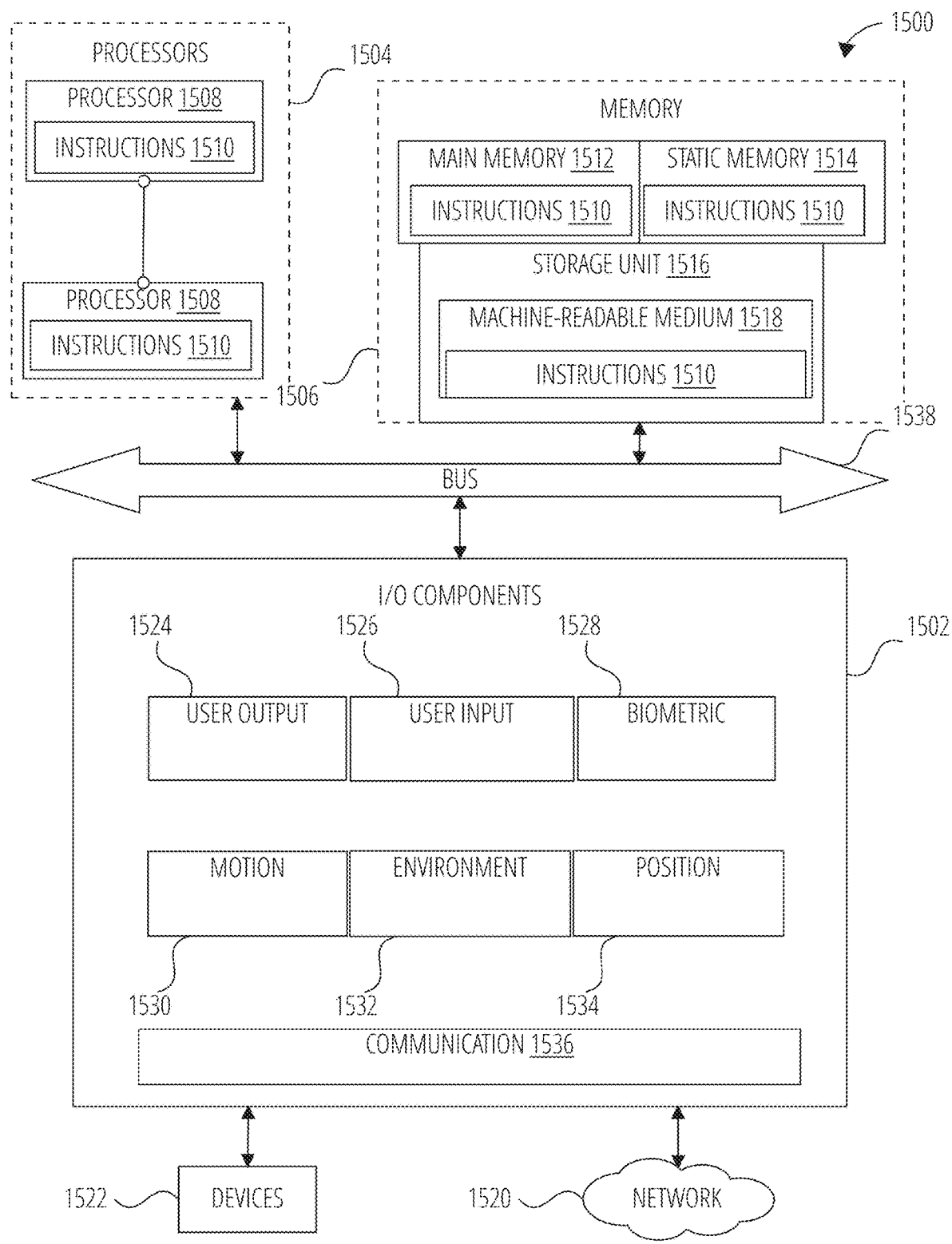
FIG. 15 is a diagrammatic representation of a machine in the form of a computer system within which a set of instructions may be executed for causing the machine to perform any one or more of the methodologies discussed herein, in accordance with some example embodiments.

FIG. 15 is a diagrammatic representation of the machine 1500 within which instructions 1510 (e.g., software, a program, an application, an applet, an app, or other executable code) for causing the machine 1500 to perform any one or more of the methodologies discussed herein may be executed. For example, the instructions 1510 may cause the machine 1500 to execute any one or more of the methods described herein. The instructions 1510 transform the general, non-programmed machine 1500 into a particular machine 1500 programmed to carry out the described and illustrated functions in the manner described. The machine 1500 may operate as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1510, sequentially or otherwise, that specify actions to be taken by the machine 1500. Further, while only a single machine 1500 is illustrated, the term "machine" shall also be taken to include a collection of machines that individually or jointly execute the instructions 1510 to perform any one or more of the methodologies discussed herein. The machine 1500, for example, may comprise the client device 102 or any one of a number of server devices forming part of the Database service manager 108. In some examples, the machine 1500 may also comprise both client and server systems, with certain operations of a particular method or algorithm being performed on the server-side and with certain operations of the particular method or algorithm being performed on the client-side.

The machine 1500 may include processors 1504, memory 1506, and input/output I/O components 638, which may be configured to communicate with each other via a bus 1538. In an example, the processors 1504 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, at least one processor 1508 that execute the instructions 1510. The term "processor" is intended to include multi-core processors that may comprise two or more independent processors (sometimes referred to as "cores") that may execute instructions contemporaneously. Although FIG. 15 shows multiple processors 1504, the machine 1500 may include a single processor with a single-core, a single processor with multiple cores (e.g., a multi-core processor), multiple processors with a single core, multiple processors with multiples cores, or any combination thereof.

The memory 1506 includes a main memory 1512, a static memory 1514, and a storage unit 1516, both accessible to the processors 1504 via the bus 1538. The main memory 1506, the static memory 1514, and storage unit 1516 store the instructions 1510 embodying any one or more of the methodologies or functions described herein. The instructions 1510 may also reside, completely or partially, within the main memory 1512, within the static memory 1514, within machine-readable medium 1518 within the storage unit 1516, within at least one of the processors 1504 (e.g., within the processor's cache memory), or any suitable combination thereof, during execution thereof by the machine 1500.

The I/O components 1502 may include a wide variety of components to receive input, provide output, produce output, transmit information, exchange information, capture measurements, and so on. The specific I/O components 1502 that are included in a particular machine will depend on the type of machine. For example, portable machines such as mobile phones may include a touch input device or other such input mechanisms, while a headless server machine will likely not include such a touch input device. It will be appreciated that the I/O components 1502 may include many other components that are not shown in FIG. 15. In various examples, the I/O components 1502 may include user output components 1524 and user input components 1526. The user output components 1524 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1526 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1502 may include biometric components 1528, motion components 1530, environmental components 1532, or position components 1534, among a wide array of other components. For example, the biometric components 1528 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1530 include acceleration sensor components (e.g., accelerometer), gravitation sensor components, rotation sensor components (e.g., gyroscope).

The environmental components 1532 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

The position components 1534 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1502 further include communication components 1536 operable to couple the machine 1500 to a network 1520 or devices 1522 via respective coupling or connections. For example, the communication components 1536 may include a network interface component or another suitable device to interface with the network 1520. In further examples, the communication components 1536 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1522 may be another machine or any of a wide variety of peripheral devices (e.g., a peripheral device coupled via a USB).

Moreover, the communication components 1536 may detect identifiers or include components operable to detect identifiers. For example, the communication components 1536 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D barcode, and other optical codes), or acoustic detection components (e.g., microphones to identify tagged audio signals). In addition, a variety of information may be derived via the communication components 1536, such as location via Internet Protocol (IP) geolocation, location via Wi-Fi® signal triangulation, location via detecting an NFC beacon signal that may indicate a particular location, and so forth.

The various memories (e.g., main memory 1512, static memory 1514, and memory of the processors 1504) and storage unit 1516 may store one or more sets of instructions and data structures (e.g., software) embodying or used by any one or more of the methodologies or functions described herein. These instructions (e.g., the instructions 1510), when executed by processors 1504, cause various operations to implement the disclosed examples.

The instructions 1510 may be transmitted or received over the network 1520, using a transmission medium, via a network interface device (e.g., a network interface component included in the communication components 1536) and using any one of several well-known transfer protocols (e.g., hypertext transfer protocol (HTTP)). Similarly, the instructions 1510 may be transmitted or received using a transmission medium via a coupling (e.g., a peer-to-peer coupling) to the devices 1522.

Software Architecture

Figure 16:
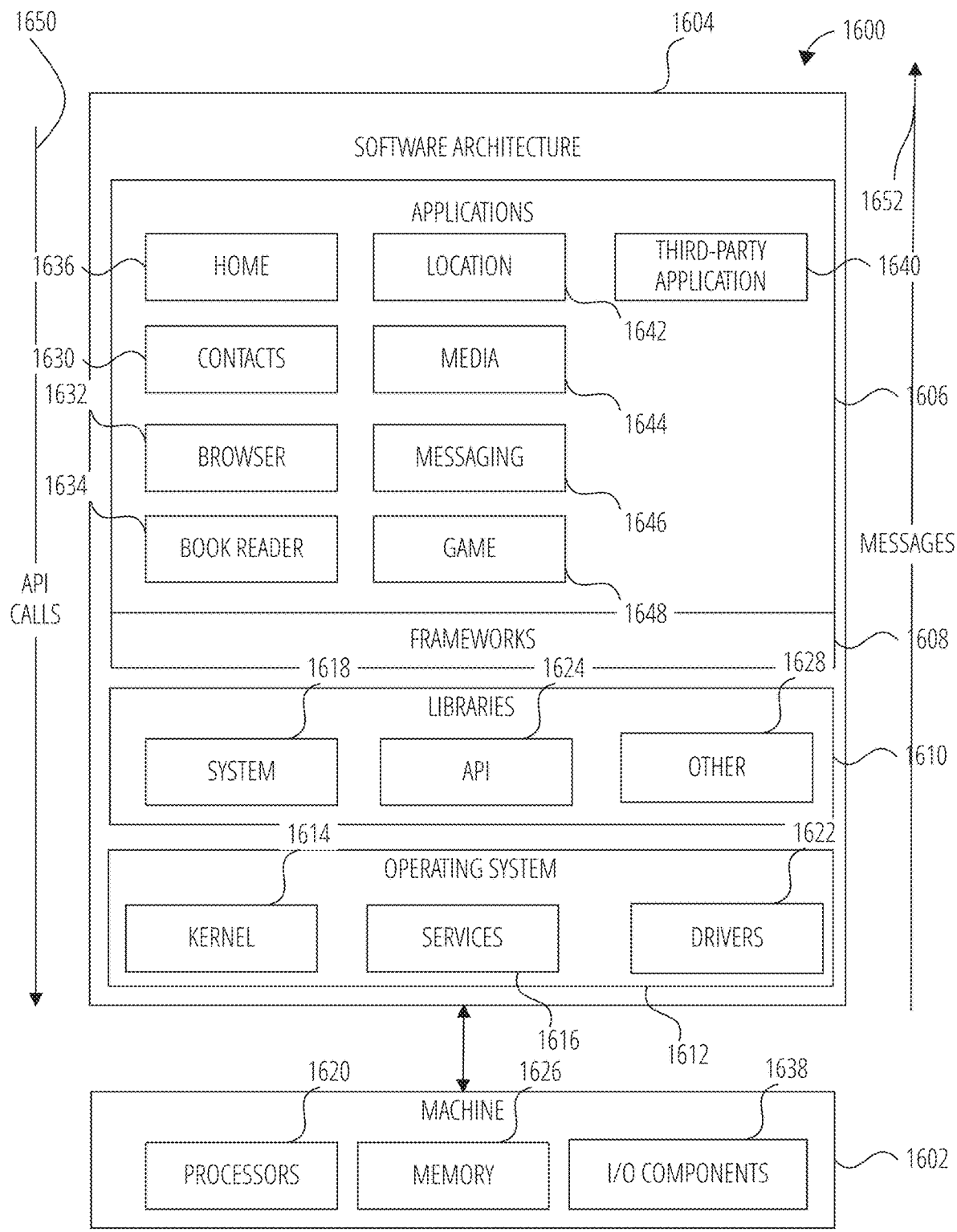
FIG. 16 is a block diagram showing a software architecture within which the present disclosure may be implemented, according to an example embodiment.

FIG. 16 is a block diagram 1600 illustrating a software architecture 1604, which can be installed on any one or more of the devices described herein. The software architecture 1604 is supported by hardware such as a machine 1602 that includes processors 1620, memory 1626, and I/O components 1638. In this example, the software architecture 1604 can be conceptualized as a stack of layers, where each layer provides a particular functionality. The software architecture 1604 includes layers such as an operating system 1612, libraries 1610, frameworks 1608, and applications 1606. Operationally, the applications 1606 invoke API calls 1650 through the software stack and receive messages 1652 in response to the API calls 1650.

The operating system 1612 manages hardware resources and provides common services. The operating system 1612 includes, for example, a kernel 1614, services 1616, and drivers 1622. The kernel 1614 acts as an abstraction layer between the hardware and the other software layers. For example, the kernel 1614 provides memory management, processor management (e.g., scheduling), component management, networking, and security settings, among other functionality. The services 1616 can provide other common services for the other software layers. The drivers 1622 are responsible for controlling or interfacing with the underlying hardware. For instance, the drivers 1622 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1610 provide a common low-level infrastructure used by the applications 1606. The libraries 1610 can include system libraries 1618 (e.g., C standard library) that provide functions such as memory allocation functions, string manipulation functions, mathematic functions, and the like. In addition, the libraries 1610 can include API libraries 1624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1610 can also include a wide variety of other libraries 1628 to provide many other APIs to the applications 1606.

The frameworks 1608 provide a common high-level infrastructure that is used by the applications 1606. For example, the frameworks 1608 provide various graphical user interface (GUI) functions, high-level resource management, and high-level location services. The frameworks 1608 can provide a broad spectrum of other APIs that can be used by the applications 1606, some of which may be specific to a particular operating system or platform.

In an example, the applications 1606 may include a home application 1636, a contacts application 1630, a browser application 1632, a book reader application 1634, a location application 1642, a media application 1644, a messaging application 1646, a game application 1648, and a broad assortment of other applications such as a third-party application 1640. The applications 1606 are programs that execute functions defined in the programs. Various programming languages can be employed to create one or more of the applications 1606, structured in a variety of manners, such as object-oriented programming languages (e.g., Objective-C, Java, or C++) or procedural programming languages (e.g., C or assembly language). In a specific example, the third-party application 1640 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1640 can invoke the API calls 1650 provided by the operating system 1612 to facilitate functionality described herein.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A computer-implemented method for sub-database replication, the method comprising:
    receiving, by one or more processors, from a database user, an identification of a column in a data table of a first database for filtering;
    clustering, by the one or more processors, the data table based on the column to generate one or more partitions sorted in the column;
    accessing, by the one or more processors, metadata for the one or more partitions of the data table, the metadata indicating a minimum value and a maximum value for the column in each partition;
    performing, by the one or more processors, file-level filtering of the one or more partitions based on the metadata without opening the one or more partitions;
    selecting, by the one or more processors, a subset of table rows of the data table based on the file-level filtering;
    performing, by the one or more processors, sub-database replication of filtered micro-partitions from the first database to a second database in a different region using the subset of table rows replication policy;
    in response to determining, by the one or more processors, a new partition is being inserted during the sub-database replication, refreshing a materialized view of the second database by inserting the new partition into the materialized view; and
    in response to determining, by the one or more processors, a deleted partition is being deleted during the sub-database replication, compacting the materialized view by removing the deleted partition from the materialized view.

2. The computer-implemented method of claim 1, wherein the data table comprises a plurality of data table rows associated with a plurality of client identifiers including data content.

3. The computer-implemented method of claim 1, wherein performing the file-level filtering comprises determining whether to replicate a partition based on the minimum value and the maximum value of the column in the metadata.

4. The computer-implemented method of claim 1, further comprising:

receiving, from the database user, a filtering behavior to be applied to the column.

5. The computer-implemented method of claim 1, wherein the first database is a primary database of the database user, and the second database is a secondary database of the database user.

6. The computer-implemented method of claim 1, wherein the sub-database replication further uses a replication policy to define objects to replicate to the second database.

7. The computer-implemented method of claim 1, wherein the sub-database replication is performed for a plurality of target accounts associated with a plurality of data consumers.

8. The computer-implemented method of claim 1, wherein the column is a customer identification column.

9. The computer-implemented method of claim 1, further comprising:
detecting an update to an entitlements table associated with the data table, wherein the entitlements table includes a plurality of entitlements table rows associated with client identifiers, consumer account identifiers, and provider account identifiers; and
performing incremental replication of the data table based on the update to the entitlements table.

10. The computer-implemented method of claim 1, further comprising:
detecting a change to the data table; and
updating the metadata for the one or more partitions affected by the change.

11. A machine comprising:
at least one processor; and
at least one memory storing instructions that, when executed by the at least one processor, cause the machine to perform operations comprising:
receiving, by one or more processors, from a database user, an identification of a column in a data table of a first database for filtering;
clustering, by the one or more processors, the data table based on the column to generate one or more partitions sorted in the column;
accessing, by the one or more processors, metadata for the one or more partitions of the data table, the metadata indicating a minimum value and a maximum value for the column in each partition;
performing, by the one or more processors, file-level filtering of the one or more partitions based on the metadata without opening the one or more partitions;
selecting, by the one or more processors, a subset of table rows of the data table based on the file-level filtering;
performing, by the one or more processors, sub-database replication of filtered partitions from the first database to a second database in a different region using the subset of table rows;
in response to determining, by the one or more processors, a new partition is being inserted during the sub-database replication, refreshing a materialized view of the second database by inserting the new partition into the materialized view; and
in response to determining, by the one or more processors, a deleted partition is being deleted during the sub-database replication, compacting the materialized view by removing the deleted partition from the materialized view.

12. The machine of claim 11, wherein the data table comprises a plurality of data table rows associated with a plurality of client identifiers including data content.

13. The machine of claim 11, wherein performing the file-level filtering comprises determining whether to replicate a partition based on the minimum value and the maximum value of the column in the metadata.

14. The machine of claim 11, wherein the operations further comprise:
receiving, from the database user, a filtering behavior to be applied to the column.

15. The machine of claim 11, wherein the first database is a primary database of the database user, and the second database is a secondary database of the database user.

16. The machine of claim 11, wherein the sub-database replication further uses a replication policy to define objects to replicate to the second database.

17. The machine of claim 11, wherein the sub-database replication is performed for a plurality of target accounts associated with a plurality of data consumers.

18. The machine of claim 11, wherein the column is a customer identification column.

19. The machine of claim 11, wherein the operations further comprise:
detecting an update to an entitlements table associated with the data table, wherein the entitlements table includes a plurality of entitlements table rows associated with client identifiers, consumer account identifiers, and provider account identifiers; and
performing incremental replication of the data table based on the update to the entitlements table.

20. The machine of claim 11, wherein the operations further comprise:
detecting a change to the data table; and
updating the metadata for the one or more partitions affected by the change.

21. A machine-storage medium storing instructions that, when executed by a machine, cause the machine to perform operations comprising:
receiving, by one or more processors, from a database user, an identification of a column in a data table of a first database for filtering;
clustering, by the one or more processors, the data table based on the column to generate one or more partitions sorted in the column;
accessing, by the one or more processors, metadata for the one or more partitions of the data table, the metadata indicating a minimum value and a maximum value for the column in each partition;
performing, by the one or more processors, file-level filtering of the one or more partitions based on the metadata without opening the one or more partitions;
selecting, by the one or more processors, a subset of table rows of the data table based on the file-level filtering;
performing, by the one or more processors, sub-database replication of filtered micro-partitions from the first database to a second database in a different region using the subset of table rows replication policy;
in response to determining, by the one or more processors, a new partition is being inserted during the sub-database replication, refreshing a materialized view of the second database by inserting the new partition into the materialized view; and
in response to determining, by the one or more processors, a deleted partition is being deleted during the sub-database replication, compacting the materialized view by removing the deleted partition from the materialized view.

22. The machine-storage medium of claim 21, wherein the data table comprises a plurality of data table rows associated with a plurality of client identifiers including data content.

23. The machine-storage medium of claim 21, wherein performing the file-level filtering comprises determining whether to replicate a partition based on the minimum value and the maximum value of the column in the metadata.

24. The machine-storage medium of claim 21, wherein the operations further comprise:

receiving, from the database user, a filtering behavior to be applied to the column.

25. The machine-storage medium of claim 21, wherein the first database is a primary database of the database user, and the second database is a secondary database of the database user.

26. The machine-storage medium of claim 21, wherein the sub-database replication further uses a replication policy to define objects to replicate to the second database.

27. The machine-storage medium of claim 21, wherein the sub-database replication is performed for a plurality of target accounts associated with a plurality of data consumers.

28. The machine-storage medium of claim 21, wherein the column is a customer identification column.

29. The machine-storage medium of claim 21, wherein the operations further comprise:

detecting an update to an entitlements table associated with the data table, wherein the entitlements table includes a plurality of entitlements table rows associated with client identifiers, consumer account identifiers, and provider account identifiers; and performing incremental replication of the data table based on the update to the entitlements table.

30. The machine-storage medium of claim 21, wherein the operations further comprise:

detecting a change to the data table; and updating the metadata for the one or more partitions affected by the change.

\* \* \* \* \*